United States Patent [19]

Dalen

[11] Patent Number: 5,402,557
[45] Date of Patent: Apr. 4, 1995

[54] DYNAMIC SELF-ADJUSTING TIE-DOWN DEVICE FOR TRANSPORTABLE ITEMS

[76] Inventor: Thomas M. Dalen, 10191 Wagonround West, Corona, Calif. 91719

[21] Appl. No.: 56,720

[22] Filed: May 3, 1993

[51] Int. Cl.⁶ .............................................. B65D 63/00
[52] U.S. Cl. .................................... 24/68 CD; 24/301
[58] Field of Search ................... 248/499; 24/300, 301, 24/298, 3 M, 68 CD; 267/74

[56] References Cited

U.S. PATENT DOCUMENTS

| | | |
|---|---|---|
| 549,736 | 9/1910 | Petty . |
| 710,670 | 10/1902 | Cutler et al. . |
| 1,509,012 | 4/1924 | Whiting . |
| 2,539,997 | 9/1949 | Graves . |
| 2,919,946 | 1/1960 | Miener .............................. 24/301 X |
| 3,672,004 | 6/1972 | Smith . |
| 3,678,542 | 7/1972 | Prete, Jr. . |
| 4,694,541 | 9/1987 | Skyba ..................................... 24/301 |
| 4,842,236 | 6/1989 | Yonts .................................. 248/499 |
| 5,063,641 | 11/1991 | Chuan . |

FOREIGN PATENT DOCUMENTS 87384 5/1956 Norway .
2181345 4/1987 United Kingdom ................ 248/499

Primary Examiner—James R. Brittain
Attorney, Agent, or Firm—Zarley, McKee, Thomte, Voorhees & Sease

[57] ABSTRACT

A tie-down device of the type comprised of an inelastic element, a locking device, and an elastic element. The elastic element is used to maintain tie-down tension under conditions where the use of an inelastic tie-down alone could develop slack thereby resulting in the failure of the tie-down. Applications where dynamic forces similar to those encountered by trailers carrying motorcycles will benefit from the use of this tie-down device.

5 Claims, 4 Drawing Sheets

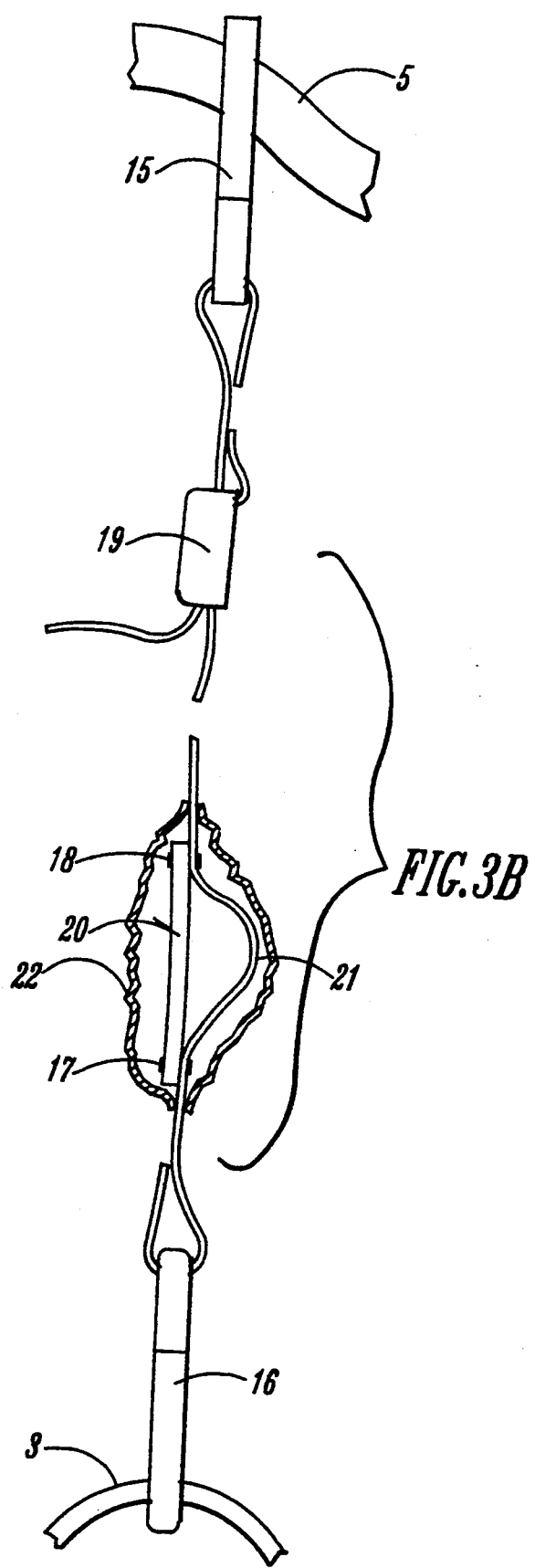

5,402,557

DYNAMIC SELF-ADJUSTING TIE-DOWN DEVICE FOR TRANSPORTABLE ITEMS

BACKGROUND OF THE INVENTION

A. Field of the Invention

This invention relates to a tie-down device, specifically to tie-down devices such as for example straps or the like that have hooking connections at opposite ends which in many cases can be adjusted lengthwise, but are not generally elastic.

B. Problems in the Art

The tie-down device of this invention corrects a problem in the transport of items such as, for example, motorcycles on trailers, as well as -the transport of other items with similar tie-down requirements.

Extant tie-downs of the generally non-elastic type do not include any means for dynamic self-compensation of the length of the tie-down mechanism. Specifically, when transporting motorcycles on a trailer, current such tie-downs, even though pulled taut, can develop a slack in the tie-down because the motorcycle can move vertically downward relative to its carrier thus loosening the straps momentarily and allowing them to disengage from the motorcycle causing the vehicle to fall off the carrier.

The tie-down may be tightened or the suspension system of the cycle compressed to eliminate the possible downward movement of the motorcycle, however, to do so either requires much more strength than some motorcycle owner can apply or over-stresses the suspension system of the motorcycle itself. It could also over-stress the tie-down or contribute to its premature failure.

Experience with using the tie-down disclosed in U.S. Pat. No. 3,678,542 has resulted in the loss of the motorcycle from its carrier when subject to off-road traveling conditions often encountered by motorcyclists. It was specifically this type of problem that led to the development of the alternative dynamic, self-adjusting tie-down device of the present invention.

A need therefore exists in the art for dealing with the types of problems mentioned above. Using the particular example of off-road hauling of motorcycles, the need exists for a tie-down device where the motorcycle will continue to be tied-down even over off-road transporting and without using undue force on the tie-down and without over-stressing the suspension system of the motorcycle itself.

Similar problems with respect to other uses of such tie-downs other than the motorcycle example are analogous. For example, securing any object with such tie-downs involves tightening them as much as possible without damage to the item, the tie-down or whatever it is tied to. Slack, even small, can develope, especially with respect to forces that can be generated on bumpy roads or terrain. The need therefore exists for an improved tie-down that can be advantageously applied to a variety of uses for tie-downs.

C. Objects and Advantages of the Present Invention

Accordingly besides the objects mentioned above, several objects and advantages of the present invention are:

(1) to provide a tie-down ! for motorcycles and other items that responds dynamically to the forces acting on the tie-down mechanism to prevent the tied-down item from escaping its restraints, (2) to provide a tie-down for motorcycles and other items that is easy to use, (3) to provide a tie-down for motorcycles and other items that is reliable under difficult, including off-road transport, conditions.

(4) to provide a tie-down for motorcycles and other items that does not over-stress the item being tied-down, (5) to provide a tie-down for motorcycles and other items that is easy to manufacture using readily available materials, (6) to provide a tie-down for motorcycles and other items that is produced and sold at a price comparable with extant tie-down devices that do not provide the added dynamic self-adjusting capabilities of the present invention, (7) to provide a tie-down that can be utilized for a wide variety of tie-down purposes, (8) to provide a tie-down which is non-complex and durable.

These and other objects, features, and advantages of the present invention will become more apparent with reference to the accompanying specification and claims.

SUMMARY OF THE INVENTION

The present invention comprises a generally inelastic tie-down device that incorporates an elastic element along its length, and is used to hold items in place when movement or shifting of the tied-down item or other forces would cause a non-elastic tie-down device to loosen and thereby possibly fail to perform in certain applications of transport.

The elastic element is secured along the length of the generally inelastic tie-down device in such a manner that when the elastic element is in its normal Or relaxed position a certain amount of slack is allowed in that portion of the generally inelastic tie-down device between points where the elastic element is attached thereto. When the tie-down device is made taut during a tie-down application, the elastic element is then stretched. Any slackening of the tie-down during the application would then be compensated for by the elastic element forcing the slack to be taken up without a loosening of the entire tie-down device.

BRIEF DESCRIPTION OF THE DRAWINGS

FIG. 3B is similar to FIG. 3A but shows the preferred embodiment of the present invention in a tie-down application, compensating for slack developed after encountering compressive dynamic forces.

DETAILED DESCRIPTION OF PREFERRED EMBODIMENT

Figure 1A:
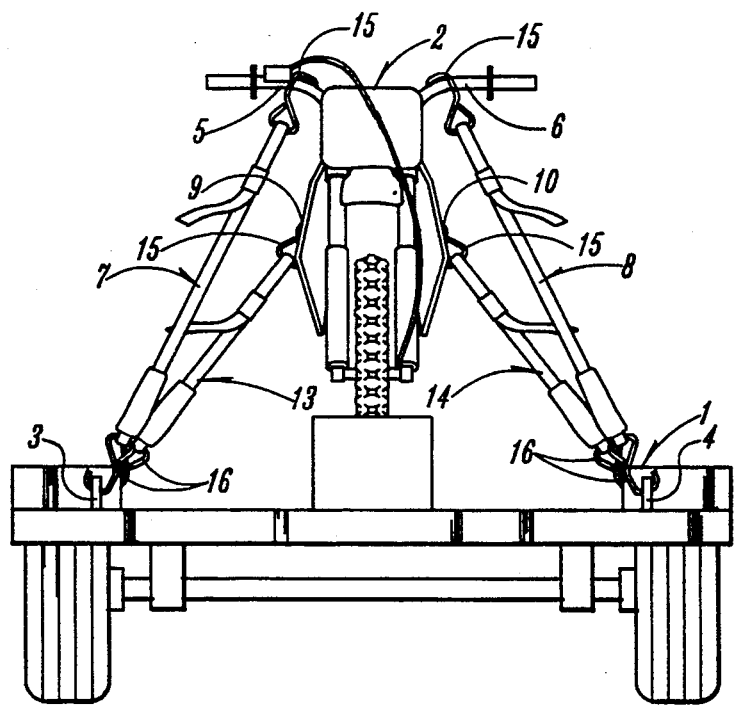
FIG. 1A is a front elevational view of a front pair of tie-down devices according to the present invention as utilized to tie-down a motorcycle mounted on a transport carrier.

In order to provide a better understanding of the invention, a preferred embodiment will now be described in detail. It is to be understood that this is but one form the invention can take and is exemplary only.

The drawings will be referred to in this description. Reference numerals will be used to indicate certain parts and locations in the drawings. The same reference numerals will indicate the same parts and locations in the drawings unless otherwise indicated.

Figure 1B:
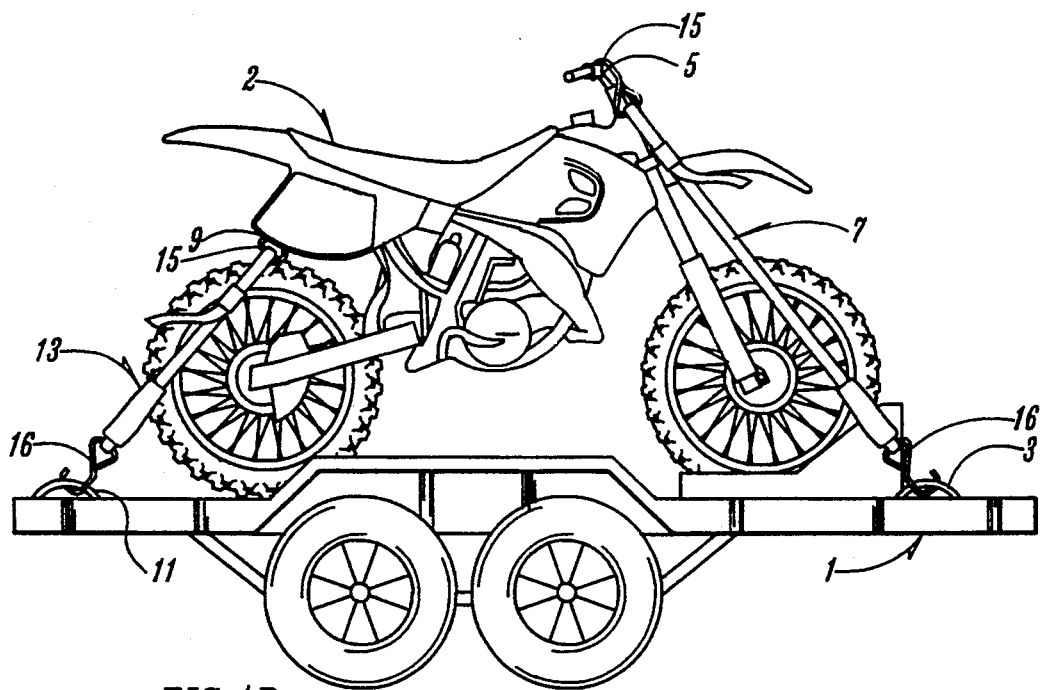
FIG. 1B is a side elevational view of FIG. 1A.

A typical installation of dynamic self-adjusting tie-down devices (see reference numerals (7), (8), (13), and (14)) for transportation items according to a preferred embodiment of the present invention, is illustrated in FIG. 1A (front view) and FIG. 1B (side view).. The tie-down devices (7), (8), (13), and (14) provide the mechanism for holding the item transported, here the motorcycle (2), in a vertical position on its transport carrier (1) (e.g. trailer or vehicle bed). Two pair of tie-downs are used in this example to secure the motorcycle; one pair forward (7), (8) and another pair in the rear (13), (14). It is to be understood that sometimes one pair would be sufficient if the front wheel of cycle 2, for example, were in a wheel chock. Hooks (16) are used to connect the tie-down devices to the transport carrier frame at forward locations (3), (4) and rear locations (11), (12) of trailer (1). Hooks (15) are also used to connect the tie-down device to the motorcycle at forward positions (5), (6) (e.g. the handle bars) and at rear positions (9), (10) (e.g. rear frame portions).

Figure 2A:
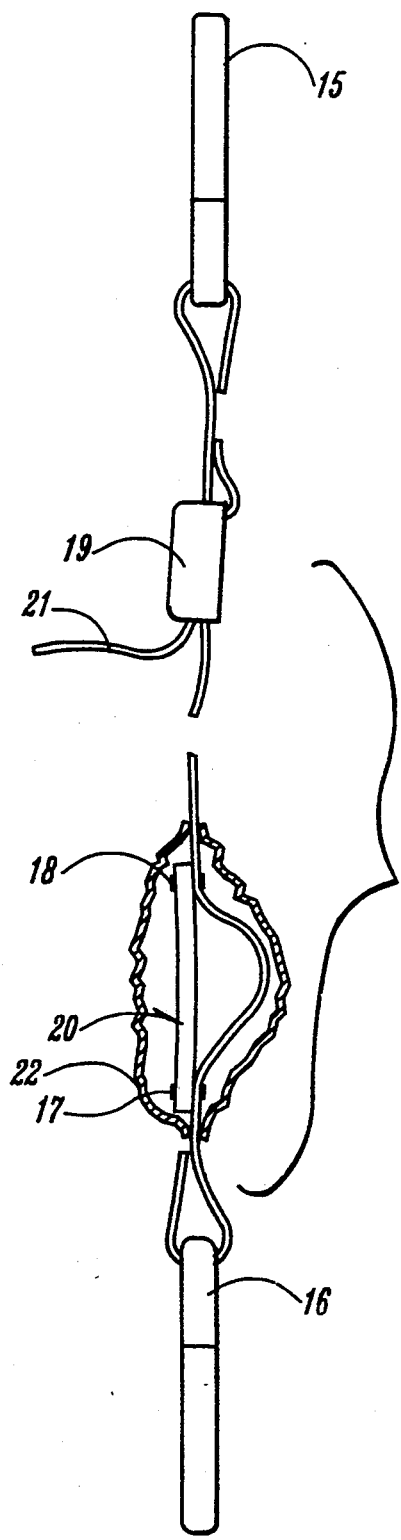
FIG. 2A is an enlarged isolated view of a preferred embodiment of the present invention showing the tie-down in an unextended or non-taut state.

A typical embodiment of the dynamic self-adjusting tie-down device (7), (8), (13), and (14) for transportable items is illustrated in more detail in FIG. 2A (front view). The tie-down device uses a hook at the top (15) and at the bottom (16) to connect the tie-down device to the object (motorcycle (2) for example) being secured and the transport device (motorcycle trailer (1) for example). Each tie-down consists of a generally inelastic strap (21) to which are attached (by stitching or otherwise) hooks (15), (16) and an adjustable locking device (19) see U.S. Pat. No. 3,678,542. An elastic member (20) (e.g. rubber-type material) is attached to the inelastic strap (21) by means of, for example, two rivets (17), (18). It could be attached in other ways. Some examples are stitching or bolts. Others are possible. A protective cover (22) (shown in cross section in FIGS. 2A-C and 3A-B) surrounds elastic member (20). In the preferred embodiment, cover (22) is made of nylon sack cloth (like that used for back packs and the like). It is formed in a sleeve and is attached top and bottom to straps (21) by stitching.

FIG. 2A shows the tie-down as it would appear when it is not drawn taut. Elastic member 20 is shown in the normal unextended position. It can be seen that a portion of strap 21 between rivets (17) and (18) is slackened; forming a sort of bulge away from elastic member (20). The slack exists between rivets (17) and (18). Note how cover (22) is in a relaxed and wrinkled state.

Figure 2B:
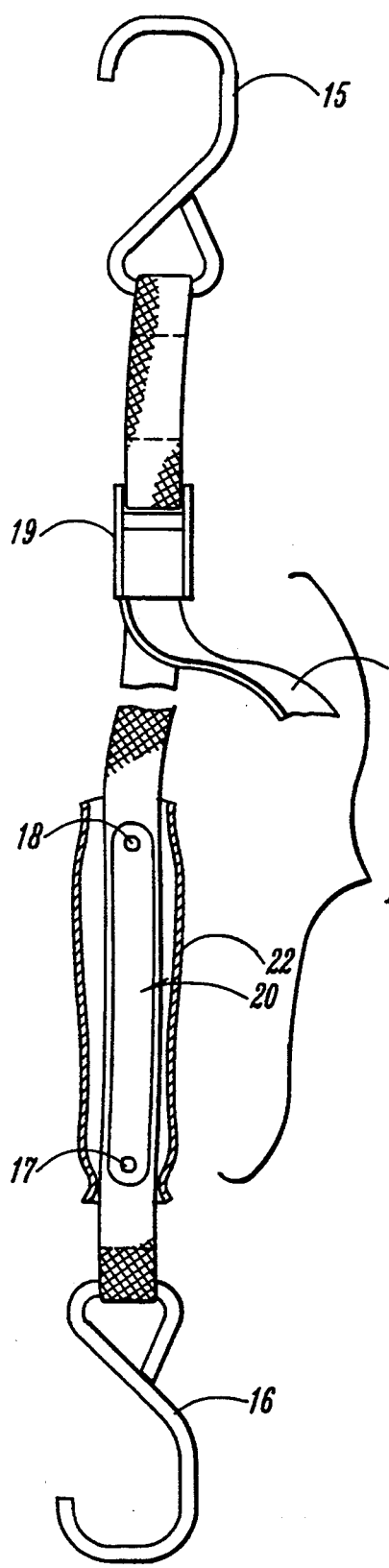
FIG. 2B is essentially similar to FIG. 2A but showing the preferred embodiment in an extended or taut position.
Figure 2C:
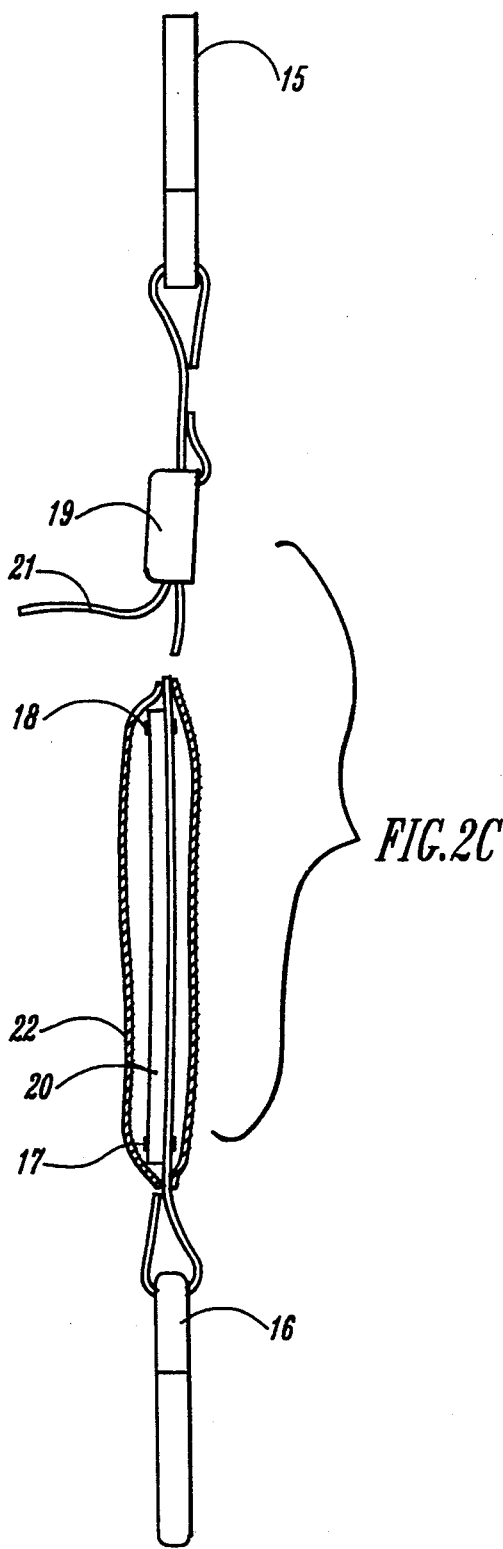
FIG. 2C is a side view of FIG. 2B.

FIGS. 2B and 2C show, in comparison to FIG. 2A, the tie-down when in a taut position. To make the entire strap (21) taut between hooks (15) and (16), would in turn stretch elastic member (20) from its normal unextended position in FIG. 2A. Thus, elastic member (20) would be stretched directly adjacent and parallel to the portion of strap (21) between rivets (17) and (18). Elastic member (20), essentially would lay right next to strap (21).

In that extended state, elastic member (20) would attempt to return to its original position. It would be precluded from doing so because its resilient force has been overcome by pulling the tie-down taut. However, if any Slack would be experienced anywhere along strap (21) (by shifting of the object or forces experienced while travelling), elastic member (20) would resiliently move rivets (17) and (18) towards one another to take up as much of that slack as is possible. Member (20) would essentially pull any slack to a location between rivets (17) and (18) and then contract to maintain some tautness in the tie-down. Note how cover (22) now is also brought taut.

A specific example of operation and the manner of using the dynamic self-adjusting tie-down device for transportable items, according to the preferred embodiment of the present invention, is set forth below. Its normal use is identical to that for tie-down devices in present use. Namely, one can secure the object (for example a motorcycle (2)) to its transport carrier (1) by attaching four tie-downs (7), (8), (13), and (14) as illustrated in FIGS. 1 and 2. Hooks (15) and (16) are used for attaching the tie-downs to the motorcycle at (5), (6), (9), (10) for example and the transport carrier at (3), (4), (11), (12) for example. After the hooks are attached to the transport carrier (motorcycle trailer (1) for example) and to the object being tied-down (motorcycle (2) for example), any slack or looseness of the inelastic tie-down strap is pulled taut through the extant locking device (19) (see U.S. Pat. No. 3,678,542--other types of locking devices are possible). This action puts the elastic member (20) of the tie-down device under tension. The cinching of the inelastic strap (21) through the locking device (19) stretches the elastic member (20) to which it is attached. The elastic member (20) is elongated (see FIGS. 2B and 2C) so as to compensate for any slack in the inelastic member (21) that can develop when the transport carrying the motorcycle, for example, encounters rough terrain sufficient to cause the inelastic member (21) to go slack.

Figure 3A:
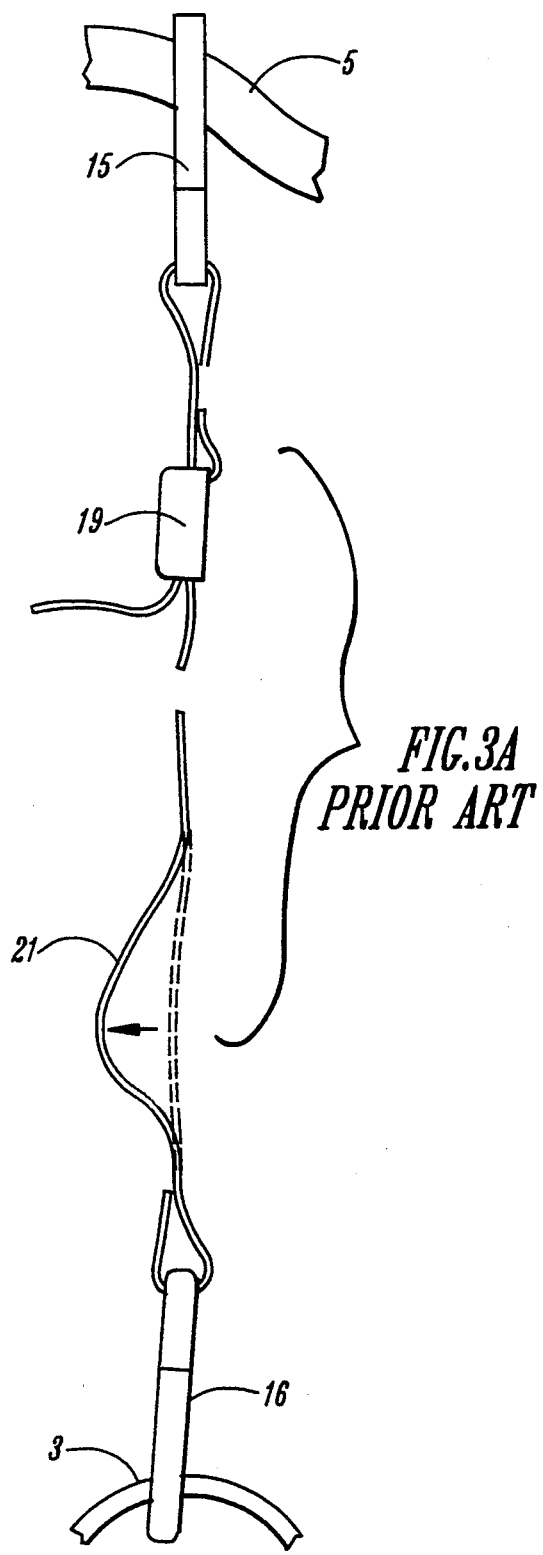
FIG. 3A is an elevational view of a prior art tie-down device in a tie-down application but after encountering compressive dynamic forces thereby showing how slack can develope in the tie-down.

FIG. 3A illustrates the buckling or slackening of extant prior art tie-downs under a condition of travel sufficient to cause the inelastic member (21) to Go slack. The previously taut position of strap (21) at the point it buckles, is shown in ghost lines. Without elastic member (20) there is nothing to take up the slack, and as shown in FIG. 3A, hook (16), for example, may separate from tie-down point (3) on trailer (1), which may cause snap-back damage to cycle (2) or the tie-down, or even cause disconnection of hook (16).

FIG. 3B illustrates the present invented tie-down where the inelastic member (21) has buckled but where tension of the tie-down is maintained by the elastic member (20). Maintaining tension is required to ensure that hooks connecting the tie-downs do not disengage from the transport carrier and/or the object, for example a motorcycle, being transported (see, e.g., the beginning of disengagement of lower hook (16) in FIG. 3A) which is avoided in FIG. 3B.

It is to be understood that the elastic element added for the purpose of ensuring the proper function of tie-downs under these types of conditions is selected to have properties that allows the inelastic element to be pulled taut without exceeding the elastic limit of resiliency of the elastic element.

Accordingly, the reader will see that the dynamic self-adjusting tie-down for transportable items will prevent or deter potentially harmful slackening of tie-downs when items are being transported over certain terrains or when other forces come into play. In addition, because the use of the present invention is essentially identical to that of extant tie-downs as disclosed in U.S. Pat. No. 3,678,542, the user will be able to carry out the use easily. Experience with extant tie-downs has shown that it is relatively easy for those types of tie-downs to slacken under certain transport conditions causing the object being transported, a motorcycle for example, to be dumped and damaged. The present invention prevents the tie-down from slackening thereby ensuring that the object being transported remains secured.

The protective cover (22) could be placed over the elastic member (20) to protect it from the elements and harmful contact. It could alternatively take the form of an accordian-type rubber sleeve having top and bottom ends substantially closed around the strap (21) to hold it in place. Other forms of cover (22) and its positioning or attachment relative to strap (21) are possible.

Although the description above is primarily in reference to transporting motorcycles with a motorcycle trailer, the same principle of tie-down has application more generally. The specific example should not be construed as limiting the scope of the invention but as merely providing an illustration of the presently preferred embodiment of this invention. For example, the carrier may be another type of transport such as an aircraft, ship, auto, truck, and the like, and the object being transported may be any item, particularly those that may change shape or orientation when subjected to the normal forces of transport. Note also that in the preferred embodiment, the elastic member (20) is preferably placed as near to a hook (15) or (16) as possible, but could be placed anywhere along strap (21). Also, it can be of a variety of different lengths, depending on the size and application of the tie-down. For example, elastic member (20) could be several inches long or many inches long.

Thus the scope of the invention should be determined by the appointed claims and their legal equivalent, rather than the example given.

I claim:

1. A tie-down of a generally non-elastic strap-type having hooking connections at opposite ends of a strap and a length adjustment component intermediate of the ends, the improvement comprising:

a device attached along the length of the strap which is resiliently expandable so as to counteract any slackening of the strap after the tie-down is extended to a taut position;

the device comprising a resilient member having opposite ends secured to the strap by securing members which extend through the resilient member and the strap, the resilient member having a lateral width not substantially larger than the lateral width of the strap and a thickness not greatly larger than the thickness the strap;

the device having extended and normal positions, when in the normal position the strap is adjacent the device but is slackened between the ends of the device, and when the strap is taut the device is expanded from its normal position but continues to resiliently urge itself to its normal position; and a flexible cover positioned over the device, the securing members, and the strap at the location of the device, the cover extending beyond and over the securing members, the cover being expandable with the device to cover and enclose the device and securing members to protect the device and securing members from the elements and to house the slacking of the strap between the securing members.

2. The tie-down of claim 1 wherein the tie-down is comprised of two strap pieces which adjoin at the adjustment device, so that the length of the entire tie-down can be adjusted allowing the distance between opposite ends to be adjusted.

3. The tie-down of claim 1 wherein the securing members are rivets.

4. The tie-down of claim 1 wherein the device is positioned near one end of the strap.

5. The tie-down of claim 1 wherein the device is connected generally in parallel with the strap.

* * * * *